United States Patent
Takano et al.

(10) Patent No.: US 8,378,876 B2
(45) Date of Patent: Feb. 19, 2013

(54) OPERATION TERMINAL, PROCESSING METHOD PERFORMED BY THE OPERATION TERMINAL, INFORMATION PROCESSING APPARATUS, INFORMATION PROCESSING SYSTEM, AND INFORMATION PROCESSING METHOD PERFORMED BY THE INFORMATION PROCESSING SYSTEM

(75) Inventors: Hiroaki Takano, Saitama (JP); Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 12/844,105

(22) Filed: Jul. 27, 2010

(65) Prior Publication Data

US 2011/0025543 A1 Feb. 3, 2011

(30) Foreign Application Priority Data

Aug. 3, 2009 (JP) ................................. 2009-180995

(51) Int. Cl.
*G08C 19/12* (2006.01)
(52) U.S. Cl. ...................................... 341/176; 341/173

(58) Field of Classification Search .................. 341/176, 341/173, 169
See application file for complete search history.

(56) References Cited

U.S. PATENT DOCUMENTS

| 7,676,152 B2* | 3/2010 | Yamabana et al. | ............... 398/38 |
| 7,998,746 B2* | 8/2011 | Otillar et al. | .................. 436/151 |
| 8,104,345 B2* | 1/2012 | Bruckl et al. | ............... 73/514.31 |
| 8,217,789 B2* | 7/2012 | Script | ........................ 340/545.1 |

FOREIGN PATENT DOCUMENTS

| JP | 2004-120641 A | 4/2004 |
| JP | 2005-130395 A | 5/2005 |
| JP | 2005-245115 A | 9/2005 |

* cited by examiner

*Primary Examiner* — Henry Choe

(57) ABSTRACT

There is provided an operation terminal including a mouse which has a spherical object, an electric power acquisition section which has a piezoelectric element and also converts energy generated by rotation of the spherical object by a force applied by a user into energy for striking the piezoelectric element, and a capacitor section which acquires and accumulates electric power generated by striking the piezoelectric element.

9 Claims, 9 Drawing Sheets

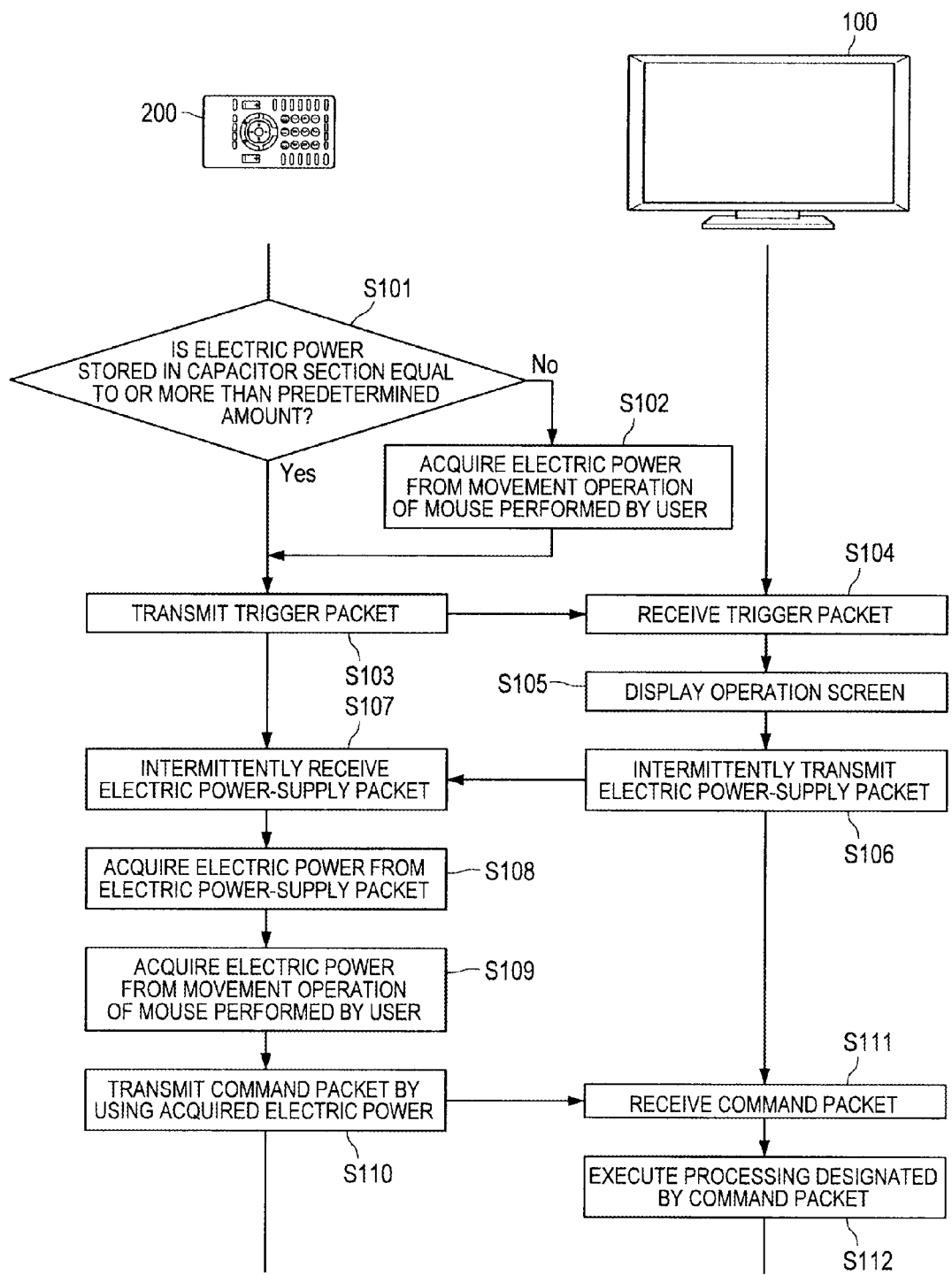

OPERATION TERMINAL, PROCESSING METHOD PERFORMED BY THE OPERATION TERMINAL, INFORMATION PROCESSING APPARATUS, INFORMATION PROCESSING SYSTEM, AND INFORMATION PROCESSING METHOD PERFORMED BY THE INFORMATION PROCESSING SYSTEM

BACKGROUND OF THE INVENTION

1. Field of the Invention

The present invention relates to an operation terminal, a processing method performed by the operation terminal, an information processing apparatus, an information processing system, and an information processing method performed by the information processing system.

2. Description of the Related Art

There has been widely used a remote control utilizing infrared data communication as a remote control for an information processing apparatus such as a TV set. However, in the case of using the remote control utilizing infrared data communication, it is necessary to direct the light-emitting part of the infrared light on the remote control toward the information processing apparatus, because the directivity of the infrared light is strong. Since the directivity of radio waves is relatively weak, an RF (Radio Frequency) remote control using a radio wave has recently been developed, and has become a mainstream. Further, attempts to standardize the RF remote control are conducted by each organization.

For example, in accordance with near field communication standard IEEE (registered trademark) (Institute of Electrical and Electronic Engineers) 802.15.4, ZigBee (registered trademark) is standardized as specifications for a network layer, a security layer, and an application layer which correspond to upper layer of IEEE (registered trademark) 802.15.4. The specification of ZigBee (registered trademark) is approved by ZigBee (registered trademark) Alliance as version 1.0. IEEE (registered trademark) 802.15.4 is completed at Standardization Committee of IEEE (registered trademark) as specifications for a physical layer and a MAC (Media Access Control) layer.

In addition, based on IEEE (registered trademark) 802.15.4, RF remote control standard ZigBee (registered trademark) RF4CE (Radio Frequency for Consumer Electronics) v1.0 spec is standardized by trade organizations.

There have been many examples of the remote control using, as electric power to be used by the remote control, the electric power supplied from a built-in battery. In order to eliminate the battery, various technologies have been proposed recently. For example, there is disclosed a technology for activating a remote control by electric power generated by using an piezoelectric element which is generated by pressure at the time of button operation by a user (for example, refer to Japanese Patent Application Laid-Open No. 2005-245115 or Japanese Patent Application Laid-Open No. 2005-130395). Further, there is disclosed a technology for supplying electric power to the remote control via a wireless signal (for example, refer to Japanese Patent Application Laid-Open No. 2004-120641).

SUMMARY OF THE INVENTION

However, in the technology for activating a remote control by the electric power generated by using an piezoelectric element which is generated by the pressure at the time of button operation by the user, it is necessary for the user to press the button a plurality of times when the charge amount does not reach a predetermined amount by pressing the button once, for example. There was an issue that the action of pressing the button the plurality of times provided an unnatural feeling to the user.

In light of the foregoing, it is desirable to provide a novel and improved technology which is capable of supplying electric power to be used by an operation terminal which does not have a battery without providing an unnatural feeling to the user.

According to an embodiment of the present invention, there is provided an operation terminal which includes a spherical object, an electric power acquisition section which has a piezoelectric element and also converts energy generated by rotation of the spherical object by a force applied by a user into energy for striking the piezoelectric element, and a capacitor section which acquires and accumulates electric power generated by striking the piezoelectric element.

The operation terminal may further include an input section which accepts input of operation information including a command for designating processing that an information processing apparatus is caused to execute, a command acquisition section which acquires the command from the operation information the input of which is accepted by the input section, a trigger packet generation section which generates, when the command is acquired by the command acquisition section, a trigger packet which is smaller than the command packet including the command, an electric power-supply control section which supplies the electric power accumulated in the capacitor section, and a transmission section which transmits the trigger packet generated by the trigger packet generation section to the information processing apparatus via a wireless signal by using the electric power supplied from the electric power-supply control section.

The operation terminal may further include an electric power-supply packet acquisition section which acquires an electric power-supply packet for supplying electric power from the information processing apparatus which received the trigger packet via a wireless signal, and a command packet generation section which generates the command packet. The capacitor section may acquire and accumulate electric power from the electric power-supply packet acquired by the electric power-supply packet acquisition section. The transmission section may further transmit the command packet generated by the command packet generation section to the information processing apparatus by using the electric power supplied from the electric power-supply control section.

The operation terminal may further include an electric power-supply packet acquisition section which acquires an electric power-supply packet for supplying electric power from the information processing apparatus which received the trigger packet via a wireless signal. The capacitor section may acquire and accumulate electric power from the electric power-supply packet acquired by the electric power-supply packet acquisition section. The input section may include the spherical object, a selection signal accepting section for accepting a selection signal from the user, and a detection section for detecting a rotation direction and a rotation amount of the spherical object. The transmission section may further transmit the rotation direction and the rotation amount of the spherical object detected by the detection section to the information processing apparatus and also may further transmit the selection signal accepted by the selection signal accepting section to the information processing apparatus, by using the electric power supplied from the electric power-supply control section.

According to the embodiment of the present invention described above, it is possible to supply electric power to be used by the operation terminal which does not have a battery without providing an unnatural feeling to a user.

BRIEF DESCRIPTION OF THE DRAWINGS

FIG. 10 is a sequence diagram showing a flow of processing executed by the information processing system according to the present embodiment.

DETAILED DESCRIPTION OF THE EMBODIMENTS

Figure 1:
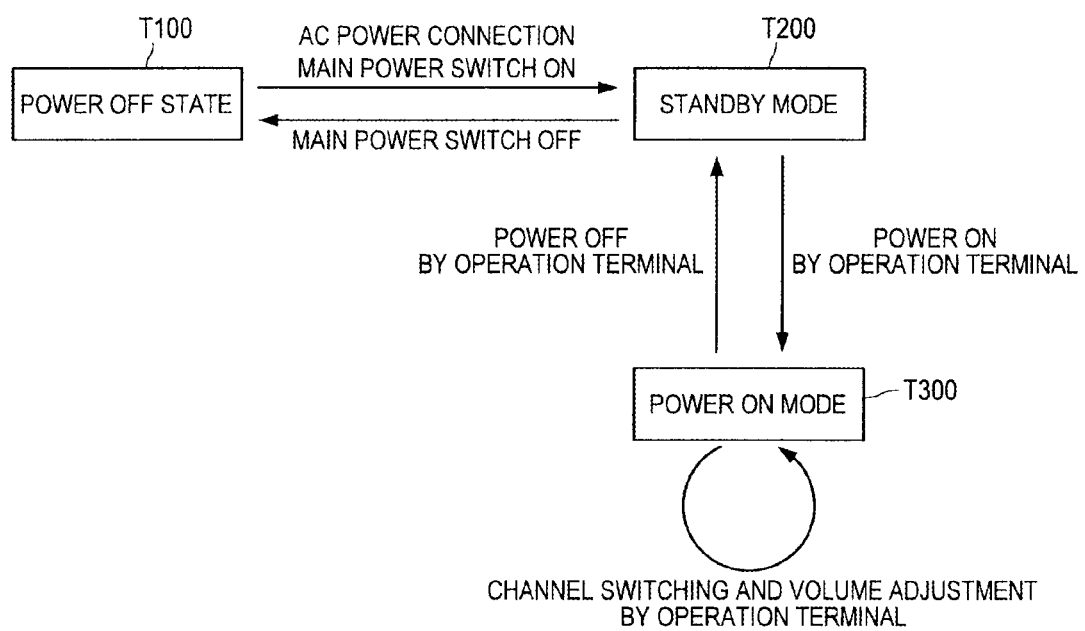
FIG. 1 is a state transition diagram of a TV set as an example of an information processing apparatus according to a present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Note that the description is given in the following order.
1. First Embodiment
   1-1. State transition of TV set as example of information processing apparatus
   1-2. Outline of information processing system
   1-3. Structure of operation terminal (side view)
   1-4. Structure of operation terminal (top view)
   1-5. Functional configuration of information processing apparatus
   1-6. Functional configuration of operation terminal
   1-7. Hardware configuration of information processing apparatus
   1-8. Hardware configuration of operation terminal
   1-9. Example of screen displayed on display section of information processing apparatus
   1-10. Flow of processing executed by information processing system
2. Modified example
3. Summary 1. First Embodiment Hereinafter, a first embodiment of the present invention will be described.

[1-1. State Transition of TV Set as Example of Information Processing Apparatus]

FIG. 1 is a state transition diagram of a TV set as an example of an information processing apparatus according to a present embodiment. With reference to FIG. 1 (refer to other figures as appropriate), a state transition of the TV set as an example of the information processing apparatus according to the present embodiment will be described.

In FIG. 1, as main functions of an operation terminal such as a remote control, there are exemplified a switching between ON and OFF of the power and a selection of channels of the TV. As shown in FIG. 1, for example, when a power ON switch of the operation terminal is held down by a user, the operation terminal transmits a power ON signal, and when the TV receives the power ON signal, the state of the TV transits from a standby mode T200 to a power ON mode T300. In the case where the state of the TV is the power ON mode T300 and when the TV receives a channel selection signal from the operation terminal, the channel of the TV is switched based on the received selection signal. In the same manner, in the case where the state of the TV is the power ON mode T300 and when the TV receives a volume selection signal from the operation terminal, the volume is controlled based on the received selection signal.

In the case where the state of the TV is one of the standby mode T200 and the power ON mode T300, the TV is capable of receiving a command using a wireless signal from the operation terminal. In the case where the state of the TV is the standby mode T200, it is preferred that the TV reduce the electric power used for receiving a radio wave to an extent that the electric power is smaller than that in the case of the power ON mode T300. This is because there is a demand for reducing the amount of electric power consumed in the case of the state of the TV being the standby mode T200. Accordingly, in the case where the state of the TV is the standby mode T200, it is preferred that the TV intermittently transit to a reception waiting state, which is a state that is capable of receiving a radio wave, to thereby reduce the electric power consumption. Further, the above is applied not only to the TV, and it is preferred that an information processing apparatus which performs processing in accordance with the radio wave received from the operation terminal, in general, intermittently transit to the reception waiting state, to thereby reduce the electric power consumption.

[1-2. Outline of Information Processing System]

Figure 2:
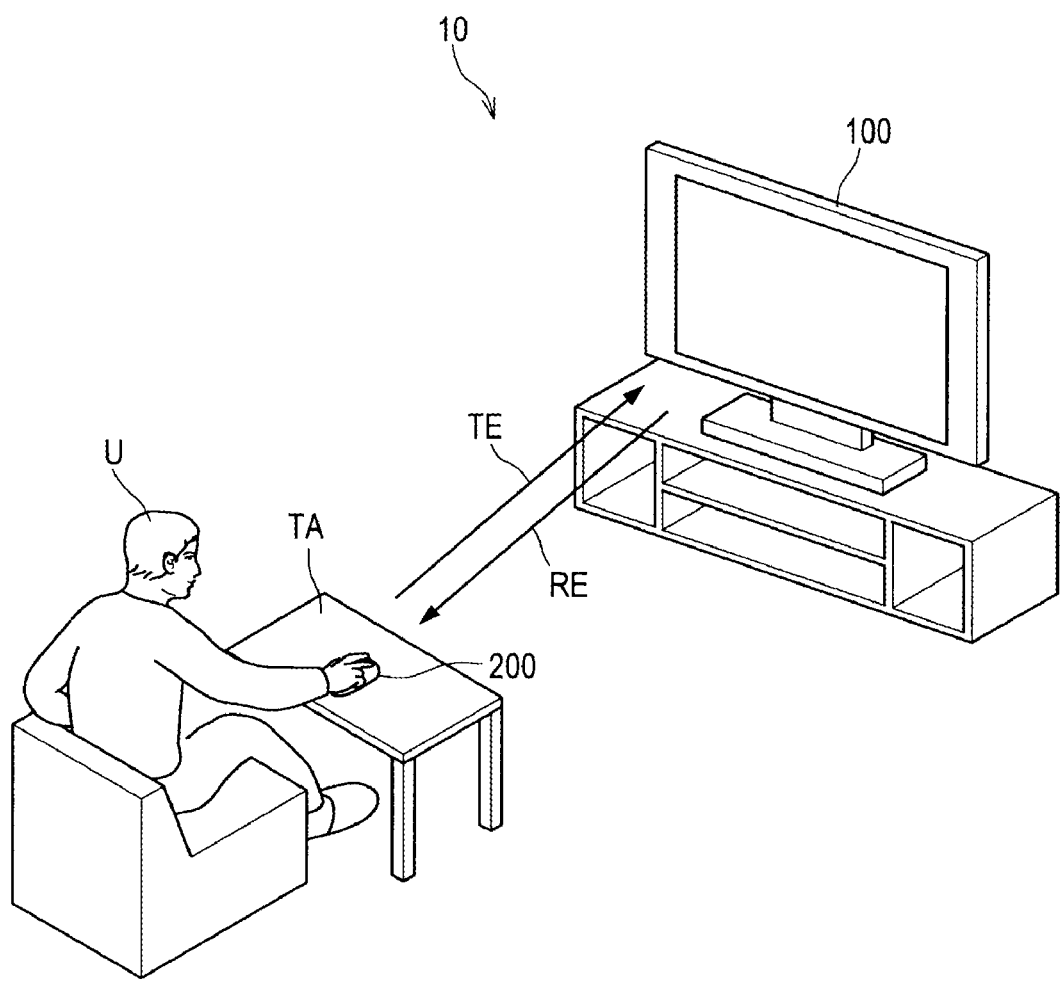
FIG. 2 is a diagram for illustrating an outline of an information processing system according to the present embodiment.

FIG. 2 is a diagram for illustrating an outline of an information processing system according to the present embodiment. With reference to FIG. 2 (refer to other figures as appropriate), the outline of the information processing system according to the present embodiment will be described.

As shown in FIG. 2, an information processing system 10 according to the present embodiment includes an information processing apparatus 100 and an operation terminal 200. The operation terminal 200 transmits a command designated by a user U to the information processing apparatus 100 via a wireless signal TE. The information processing apparatus 100 executes processing in accordance with the command received from the operation terminal 200 via the wireless signal TE. The information processing apparatus 100 may transmit a result of the execution of the processing to the operation terminal 200 via a wireless signal RE.

As the operation terminal 200, there can be used, for example, an operation terminal which has a mouse with a built-in spherical object for detecting a direction and an amount of the operation performed by the user. Further, the operation terminal internally has a piezoelectric element. When the operation terminal 200 moves on a table TA by a force applied by the user U and the spherical object rotates, the operation terminal 200 converts the energy generated by the rotation into energy for striking the piezoelectric element, and acquires and accumulates therein electric power generated by striking the piezoelectric element. The electric power accumulated in the operation terminal 200 can be used as electric power for transmitting the wireless signal TE to the information processing apparatus 100, for example.

In using the electric power accumulated in the operation terminal 200, there can be assumed various cases. For example, in the technology for providing electric power to a remote control by a wireless signal (for example, refer to the above-mentioned Japanese Patent Application Laid-Open No. 2004-120641), it is considered that it is necessary to incorporate, into the remote control itself, a function of extracting electric power from a radio wave and a function of storing the electric power in a capacitor or the like. There is considered a case where the electric power accumulated in the capacitor is gradually reduced by a leakage current, which causes shortage of electric power when needed, and it is difficult for the remote control to transmit a signal. Consequently, the operation terminal 200 may transmit a trigger packet as shown below to the information processing apparatus 100 by using the electric power accumulated in the capacitor.

When accepting input of operation information from the user U, the operation terminal 200 transmits the trigger packet, which is smaller than a command packet to be described later, to the information processing apparatus 100 via the wireless signal TE using a radio wave. When receiving the trigger packet from the operation terminal 200, the information processing apparatus 100 transmits an electric power-supply packet for supplying electric power to the operation terminal 200 via the wireless signal RE using a radio wave.

When receiving the electric power-supply packet from the information processing apparatus 100, the operation terminal 200 acquires electric power from the received electric power-supply packet and transmits a command packet, which includes a command included in the operation information, to the information processing apparatus 100 via the wireless signal TE, by using the acquired electric power. The information processing apparatus 100 receives the command packet from the operation terminal 200 and performs processing in accordance with the command included in the received command packet.

Here, as shown in FIG. 2, it can be assumed that the information processing apparatus 100 is, for example, the TV set, but the information processing apparatus 100 is not limited to the TV set. The information processing apparatus 100 may be any as long as it has a function of transmitting the electric power-supply packet to the operation terminal 200 via the wireless signal RE or a function of receiving the command packet from the operation terminal 200 via the wireless signal TE and performing processing in accordance with the command included in the received command packet. The information processing apparatus 100 may be, for example, a recording/reproducing apparatus for a TV program.

Further, it can be assumed that the operation terminal 200 is, for example, the RF remote control as described above, but the operation terminal 200 is not particularly limited to the RF remote control. The operation terminal 200 may be any as long as it has, for example, a function of accepting the input of the operation information from the user U, a function of acquiring the electric power from the electric power-supply packet received from the information processing apparatus 100 via the wireless signal RE, or a function of transmitting the command packet, which includes a command included in the operation information, to the information processing apparatus 100 via the wireless signal TE.

[1-3. Structure of Operation Terminal (Side View)]

Figure 3:
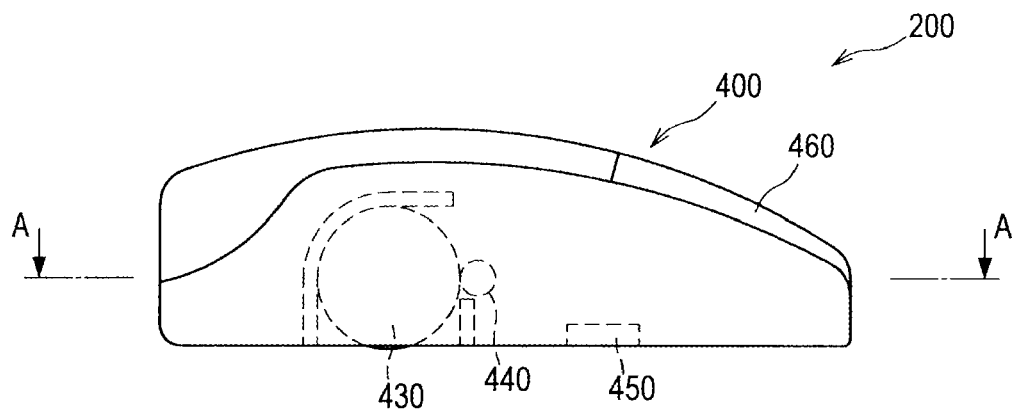
FIG. 3 is an elevational view showing an example of an operation terminal according to the present embodiment.

FIG. 3 is an elevational view showing an example of an operation terminal according to the present embodiment. With reference to FIG. 3 (refer to other figures as appropriate), a structure of the operation terminal according to the present embodiment (side view) will be described.

As shown in FIG. 3, the operation terminal 200 includes at least a spherical object 430 which rotates by operation performed by the user U and an electric power acquisition section 440 which has a piezoelectric element and also converts the energy generated by the rotation of the spherical object 430 by a force applied by the user U into energy for striking the piezoelectric element. As shown in FIG. 3, the operation terminal 200 includes a mouse 400, and the mouse 400 may include the spherical object 430, the electric power acquisition section 440, and the like. In the case where the operation terminal 200 includes the mouse 400, the user U can rotate the spherical object 430 by using, for example, a frictional force between the table TA and the spherical object 430 which is generated by causing the mouse 400 to be moved on the table TA.

Further, the operation terminal 200 may include a detection section 450 for detecting rotation direction and rotation amount of the spherical object 430 and a selection signal accepting section 460 for accepting a selection signal from the user U. In the case where the operation terminal 200 includes the mouse 400, there may be used the detection section 450 and the selection signal accepting section 460 that the mouse 400 generally has. For example, the rotation direction and rotation amount of the spherical object 430 may be detected by the detection section 450 as a distance that the spherical object 430 moves on the table TA (for example, a distance of movement in an X-axis direction and a Y-axis direction).

[1-4. Structure of Operation Terminal (Top View)]

Figure 4:
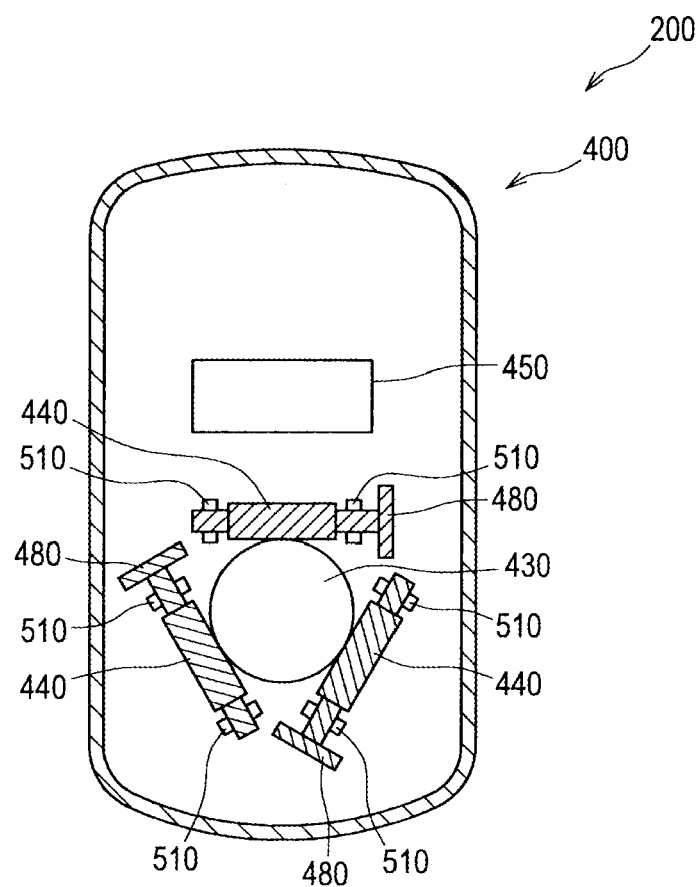
FIG. 4 is a cross sectional view taken along a line A-A of the operation terminal shown in FIG. 3.

FIG. 4 is a cross sectional view taken along a line A-A of the operation terminal shown in FIG. 3. With reference to FIG. 4 (refer to other figures as appropriate), a structure of the operation terminal according to the present embodiment (top view) will be described.

For example, the surface of the spherical object 430 is formed of a rubber or the like. The electric power acquisition section 440 is formed of, for example, a cylindrical plastic part and causes a piezoelectric element 510 to vibrate by using the energy transmitted as a rotation movement by the rotation of the spherical object 430. The electric power acquisition section 440 may directly cause the piezoelectric element 510 to vibrate, or may indirectly cause the piezoelectric element 510 to vibrate via another part. In the case where the piezoelectric element 510 is indirectly caused to vibrate, a protruding portion may be added to the axis part of the electric power acquisition section 440 and the protruding portion may strike the piezoelectric element by being rotated by the rotation of the electric power acquisition section 440. For example, the user U can cause the piezoelectric element 510 inside the operation terminal 200 to vibrate by moving the operation terminal 200 in left and right directions, in forward and backward directions, and the like on the table TA, and can store the electric power generated by the vibration.

To the electric power acquisition section 440, there may be connected an encoder 480. For example, the encoder 480 can detect rotation amounts in respective directions from the rotation of the electric power acquisition section 440 connected to the encoder 480 itself. In the case where a plurality of encoders 480 exist, the rotation amounts in the respective directions which are detected by the plurality of encoders 480 are output to the detection section 450, and the detection section 450 can detect the rotation direction and rotation amount of the spherical object 430 from the rotation amounts in the respective directions output from each encoder 480. In FIG. 4, there is shown an example in which three electric power acquisition sections 440 and three encoders 480 are provided, and the number of the electric power acquisition section 440 and the number of the encoder 480 are not limited to three and may be any number.

[1-5. Functional Configuration of Information Processing Apparatus]

Figure 5:
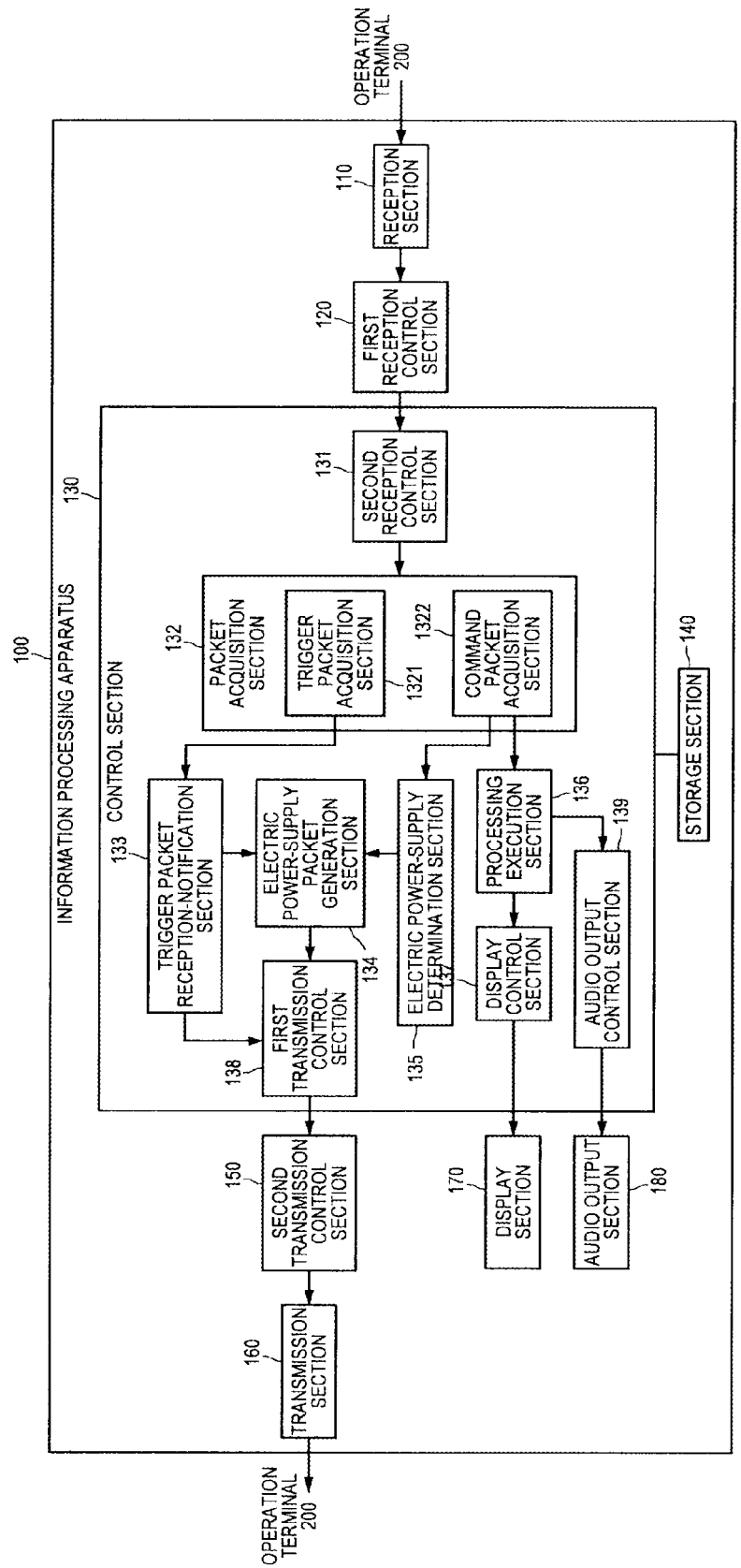
FIG. 5 is a diagram showing a functional configuration of the information processing apparatus according to the present embodiment.

FIG. 5 is a diagram showing a functional configuration of the information processing apparatus according to the present embodiment. With reference to FIG. 5 (refer to other figures as appropriate), the functional configuration of the information processing apparatus according to the present embodiment will be described.

As shown in FIG. 5, the information processing apparatus 100 includes at least a reception section 110, a control section 130, and a transmission section 160. Further, the control section 130 includes at least a packet acquisition section 132 and an electric power-supply packet generation section 134.

The reception section 110 includes an antenna and the like, and has a function of receiving a trigger packet, which is smaller than a command packet including a command for designating processing to be executed by the information processing apparatus 100, from the operation terminal 200 via a wireless signal. The trigger packet may be any as long as it is an extremely small packet, and may include only a preamble, for example.

The information processing apparatus 100 includes a first reception control section 120 as necessary. The first reception control section 120 performs, with respect to the wireless signal received by the reception section 110, analog processing such as amplification, filtering, and down-conversion as necessary, to thereby perform frequency conversion in a manner that a high-frequency signal is converted into a baseband signal. Further, in the case where the control section 130 performs processing using a digital signal, the first reception control section 120 converts an analog-type baseband signal into a digital-type baseband signal.

The control section 130 includes a second reception control section 131 as necessary. The second reception control section 131 has a function of performing demodulation processing, decoding processing, and the like with respect to the baseband signal. The demodulation processing and the decoding processing are not particularly limited.

A trigger packet acquisition section 1321 has a function of acquiring the trigger packet from the wireless signal received by the reception section 110. For example, in the case where packet identification information for identifying a trigger packet is imparted to a packet acquired from the wireless signal received by the reception section 110, the packet acquisition section 132 regards the packet as the trigger packet and outputs the packet to the trigger packet acquisition section 1321.

The electric power-supply packet generation section 134 has a function of, when the trigger packet is acquired by the trigger packet acquisition section 1321, generating an electric power-supply packet for supplying electric power. The size of the electric power-supply packet is not particularly limited, and can be appropriately adjusted in accordance with the electric power to be supplied to the operation terminal 200 in transmission of one packet. Further, the electric power-supply packet is used to supply the electric power to the operation terminal 200, and hence, information included in the electric power-supply packet is not particularly limited.

The transmission section 160 includes an antenna and the like, and has a function of transmitting the electric power-supply packet generated by the electric power-supply packet generation section 134 to the operation terminal 200 via a wireless signal. The transmission section 160 may have a configuration in which the same antenna is shared with the reception section 110 or may have a configuration which has different antenna from that included in the reception section 110.

The control section 130 includes a first transmission control section 138 as necessary. The first transmission control section 138 has a function of performing modulation processing, encoding processing, and the like with respect to the baseband signal. The modulation processing and the encoding processing are not particularly limited.

The information processing apparatus 100 includes a second transmission control section 150 as necessary. In the case where the control section 130 performs processing using a digital signal, the second transmission control section 150 converts the digital signal to be transmitted into an analog signal. Further, the second transmission control section 150 performs frequency conversion in a manner that the baseband signal is converted into a high-frequency signal by up-conversion and outputs the signal to the transmission section 160.

The control section 130 may further include a processing execution section 136. The reception section 110 further receives the selection signal, the rotation direction of the spherical object 430, and the rotation amount of the spherical object 430, which are transmitted from the operation terminal 200 by using the electric power acquired from the electric power-supply packet, and the processing execution section 136 executes processing designated by a command determined in accordance with the selection signal, the rotation direction of the spherical object 430, and the rotation amount of the spherical object 430, which are received by the reception section 110.

The information processing apparatus 100 may further include a display section 170, and the control section 130 may further include a display control section 137. The display section 170 displays a screen, and the display control section 137 causes a region corresponding to the command to be displayed within the screen and also causes a cursor 871 (for example, refer to FIG. 9) to be displayed at a position within the screen in accordance with the rotation direction and rotation amount of the spherical object 430 received by the reception section 110. When the selection signal is received by the reception section 110 while the cursor 871 exists within the region, the processing execution section 136 may execute processing designated the command.

The control section 130 may further include a trigger packet reception-notification section 133. The trigger packet reception-notification section 133 has a function of, when the trigger packet is acquired by the trigger packet acquisition section 1321, generating a trigger packet reception-notification packet for indicating that the trigger packet is received. In the case where the control section 130 further includes the trigger packet reception-notification section 133, the transmission section 160 further transmits the trigger packet reception-notification packet generated by the trigger packet reception-notification section 133 to the operation terminal 200 via a wireless signal. When receiving the trigger packet reception-notification packet from the information processing apparatus 100, the operation terminal 200 can recognize that the trigger packet is received by the information processing apparatus 100 and can stop transmitting the trigger packet.

There are various techniques which can be employed as a technique for the information processing apparatus 100 to stop transmitting the electric power-supply packet. For example, as a first technique, there can be employed a technique in which the electric power-supply packet generation section 134 sequentially generates a predetermined number of the electric power-supply packets, and the transmission section 160 sequentially transmits the predetermined number of the electric power-supply packets generated by the electric power-supply packet generation section 134 to the operation terminal 200 via a wireless signal.

As a second technique, there can be employed a technique in which the information processing apparatus 100 further includes an electric power-supply stop request packet-acquisition section. In that case, the reception section 110 further receives an electric power-supply stop request packet for indicating that the transmission of the electric power-supply packet is to be stopped from the operation terminal 200 via a wireless signal, and the electric power-supply stop request packet-acquisition section acquires the electric power-supply stop request packet from the wireless signal received by the reception section 110. Then, the electric power-supply packet generation section 134 may sequentially generate a plurality of the electric power-supply packets until the electric power-supply stop request packet is acquired by the electric power-supply stop request packet-acquisition section, and the transmission section 160 may sequentially transmit the electric power-supply packets generated by the electric power-supply packet generation section 134 to the operation terminal 200 via a wireless signal.

Further, as a third technique, there can be employed a technique in which the information processing apparatus 100 transmits an electric power-supply packet until the information processing apparatus 100 acquires a command packet from the operation terminal 200. In that case, the information processing apparatus 100 further includes a command packet acquisition section 1322, and the reception section 110 further receives the command packet transmitted from the operation terminal 200 by using electric power acquired from the electric power-supply packet. The command packet acquisition section 1322 acquires the command packet from the wireless signal received by the reception section 110. The electric power-supply packet generation section 134 sequentially generates a plurality of the electric power-supply packets until the command packet is acquired by the command packet acquisition section 1322, and the transmission section 160 sequentially transmits the electric power-supply packets generated by the electric power-supply packet generation section 134 to the operation terminal 200 via a wireless signal.

The information processing apparatus 100 may further include the command packet acquisition section 1322 and the processing execution section 136. In that case, the reception section 110 further receives the command packet transmitted from the operation terminal 200 by using electric power acquired from the electric power-supply packet, and the command packet acquisition section 1322 acquires the command packet from the wireless signal received by the reception section 110. Then, the processing execution section 136 executes processing designated by a command included in the command packet acquired by the command packet acquisition section 1322. For example, in the case where packet identification information for identifying a command packet is imparted to a packet acquired from the wireless signal received by the reception section 110, the packet acquisition section 132 regards the packet as the command packet and outputs the packet to the command packet acquisition section 1322.

There can be considered a case where it is difficult for the operation terminal 200 to transmit a command to the information processing apparatus 100 in a manner that the command is included in one packet. In that case, it is necessary that the operation terminal 200 divide the command into a plurality of pieces and transmit each of the obtained plurality of pieces of command to the information processing apparatus 100, each of the obtained plurality of pieces of command being included in a separate packet. Accordingly, in that case, the information processing apparatus 100 may further include a storage section 140 and an electric power-supply determination section 135 which determines whether electric power-resupply request information for indicating retransmission of the electric power-supply packet is added to the command packet acquired by the command packet acquisition section 1322.

In the case where the information processing apparatus 100 further includes the storage section 140 and the electric power-supply determination section 135, and when it is determined by the electric power-supply determination section 135 that the electric power-resupply request information is added to the command packet, the electric power-supply packet generation section 134 re-generates the electric power-supply packet. The transmission section 160 retransmits the electric power-supply packet generated by the electric power-supply packet generation section 134 to the operation terminal 200 via a wireless signal. When receiving the electric power-supply packet, the operation terminal 200 can acquire electric power for transmitting a command packet from the received electric power-supply packet. Further, in the case where it is determined by the electric power-supply determination section 135 that the electric power-resupply request information is added to the command packet, the processing execution section 136 causes the command included in the command packet acquired by the command packet acquisition section 1322 to be stored into the storage section 140. In this manner, it is assumed that a first command to an N−1th command (N represents an integer of 2 or more) are stored in the storage section 140. In the case where it is determined by the electric power-supply determination section 135 that the electric power-resupply request information is not added to the command packet, the processing execution section 136 combines an Nth command included in the command packet acquired by the command packet acquisition section 1322 with the first command to the N−1th command stored in the storage section 140, and executes processing designated by the obtained command.

In the case where the information processing apparatus 100 includes a display section 170, the control section 130 includes a display control section 137, and in the case where the information processing apparatus 100 includes an audio output section 180, the control section 130 includes an audio output control section 139. In the case where the information processing apparatus 100 is used as a TV set, the processing execution section 136 outputs video data to the display control section 137 and also outputs audio data to the audio output control section 139. The display control section 137 causes the display section 170 to display video based on the video data, and the audio output control section 139 causes the audio output section 180 to output audio based on the audio data.

[1-6. Functional Configuration of Operation Terminal]

Figure 6:
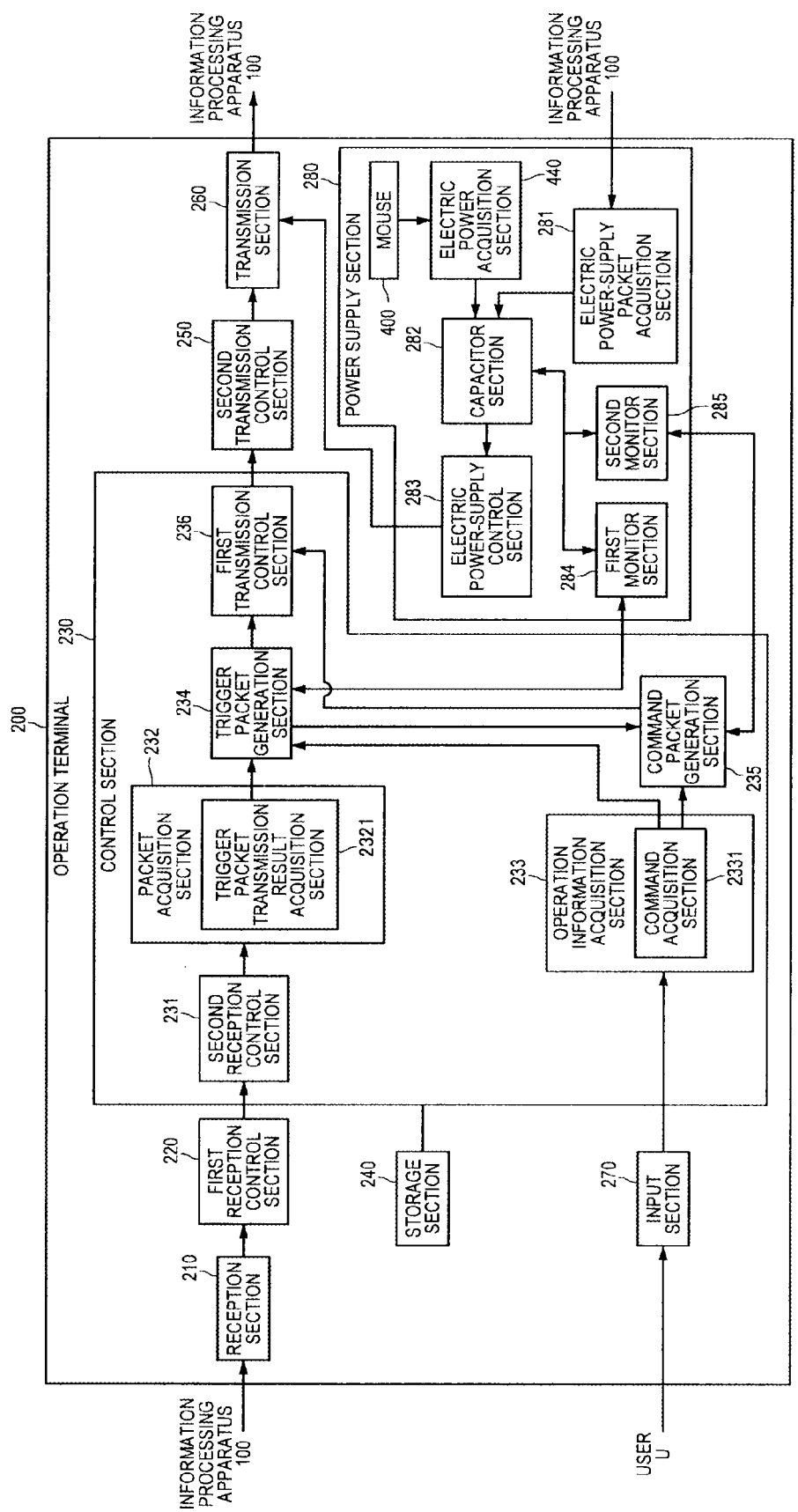
FIG. 6 is a diagram showing a functional configuration of the operation terminal according to the present embodiment.

FIG. 6 is a diagram showing a functional configuration of an operation terminal according to the present embodiment. With reference to FIG. 6 (refer to other figures as appropriate), the functional configuration of the operation terminal according to the present embodiment will be described.

The operation terminal 200 includes at least a power supply section 280. The power supply section 280 includes at least the spherical object 430, the electric power acquisition section 440, and a capacitor section 282. In FIG. 6, there is shown an example in which the power supply section 280 includes the mouse 400 that has the spherical object 430.

As shown in FIG. 6, the operation terminal 200 may include an input section 270, a control section 230, and a transmission section 260. Further, the control section 230 may include an operation information acquisition section 233 and a trigger packet generation section 234, and the operation information acquisition section 233 may include a command acquisition section 2331. The power supply section 280 may include an electric power-supply control section 283.

The input section 270 is, for example, capable of accepting input of operation information from a user U through a button operation or the like, and has a function of accepting operation information including a command for designating processing that the information processing apparatus 100 is caused to execute.

The command acquisition section 2331 has a function of acquiring the command from the operation information the input of which is accepted by the input section 270.

When the command is acquired by the command acquisition section 2331, the trigger packet generation section 234 generates a trigger packet which is smaller than the command packet including the command. As described above, the trigger packet may be any as long as it is an extremely small packet, and may include only a preamble, for example.

The electric power-supply control section 283 has a function of supplying electric power accumulated in the capacitor section 282 to the transmission section 260.

The transmission section 260 includes an antenna and the like, and has a function of transmitting the trigger packet generated by the trigger packet generation section 234 to the information processing apparatus 100 via a wireless signal by using the electric power supplied from the electric power-supply control section 283. The transmission section 260 may have a configuration in which the same antenna is shared with a reception section 210 or may have a configuration which has different antenna from that included in the reception section 210.

The control section 230 includes a first transmission control section 236 as necessary. The first transmission control section 236 has a function of performing modulation processing, encoding processing, and the like with respect to the baseband signal. The modulation processing and the encoding processing are not particularly limited.

The operation terminal 200 includes a second transmission control section 250 as necessary. In the case where the control section 230 performs processing using a digital signal, the second transmission control section 250 converts the digital signal to be transmitted into an analog signal. Further, the second transmission control section 250 performs frequency conversion in a manner that the baseband signal is converted into a high-frequency signal by up-conversion and outputs the signal to the transmission section 260.

The operation terminal 200 may further include the reception section 210 and a trigger packet transmission result acquisition section 2321. The reception section 210 receives a trigger packet reception-notification packet for indicating that the trigger packet is received via a wireless signal, from the information processing apparatus 100 which received the trigger packet via a wireless signal. The trigger packet transmission result acquisition section 2321 acquires the trigger packet reception-notification packet from the wireless signal received by the reception section 210. Further, the trigger packet generation section 234 sequentially generates a plurality of the trigger packets until the trigger packet reception-notification packet is acquired by the trigger packet transmission result acquisition section 2321, and the transmission section 260 sequentially transmits the trigger packets generated by the trigger packet generation section 234 to the information processing apparatus 100 via a wireless signal. For example, in the case where packet identification information for identifying a trigger packet transmission result is imparted to a packet acquired from the wireless signal received by the reception section 210, a packet acquisition section 232 regards the packet as the trigger packet transmission result and outputs the packet to the trigger packet transmission result acquisition section 2321.

The operation terminal 200 includes a first reception control section 220 as necessary. The first reception control section 220 performs, with respect to the wireless signal received by the reception section 210, analog processing such as amplification, filtering, and down-conversion as necessary, to thereby perform frequency conversion in a manner that a high-frequency signal is converted into a baseband signal. Further, in the case where the control section 230 performs processing using a digital signal, the first reception control section 220 converts an analog-type baseband signal into a digital-type baseband signal.

The control section 230 includes a second reception control section 231 as necessary. The second reception control section 231 has a function of performing demodulation processing, decoding processing, and the like with respect to the baseband signal. The demodulation processing and the decoding processing are not particularly limited.

The power supply section 280 may include an electric power-supply packet acquisition section 281 and the electric power-supply control section 283, and the control section 230 may include a command packet generation section 235. In that case, the electric power-supply packet acquisition section 281 acquires an electric power-supply packet for supplying electric power from the information processing apparatus 100 which received the trigger packet via a wireless signal. The capacitor section 282 acquires electric power from the electric power-supply packet acquired by the electric power-supply packet acquisition section 281 and accumulates the electric power. The electric power-supply control section 283 supplies the electric power accumulated in the capacitor section 282 to the transmission section 260. The command packet generation section 235 generates a command packet. The transmission section 260 further transmits the command packet generated by the command packet generation section 235 by using the electric power supplied from the electric power-supply control section 283.

The operation terminal 200 may further include a second monitor section 285 and an electric power-supply stop request packet-generation section. The second monitor section 285 monitors the electric power accumulated in the capacitor section 282. The electric power-supply stop request packet-generation section generates, in the case where it is determined by the second monitor section 285 that the electric power exceeds a predetermined value, an electric power-supply stop request packet for indicating that the transmission of the electric power-supply packet is to be stopped. The transmission section 260 further transmits the electric power-supply stop request packet generated by the electric power-supply stop request packet-generation section to the information processing apparatus 100. Further, the command packet generation section 235 may output the generated command packet in the case where it is determined by the second monitor section 285 that the electric power exceeds a predetermined value.

The power supply section 280 may further include a first monitor section 284. The first monitor section 284 monitors the electric power accumulated in the capacitor section 282. The trigger packet generation section 234 may further output the generated trigger packet in the case where it is determined by the first monitor section 284 that the electric power exceeds a predetermined value.

There is a case where it is difficult for the operation terminal 200 to transmit a command in a manner that the command is included in one packet. In that case, the command packet generation section 235 divides the command into a plurality of pieces and refers to the plurality of commands acquired by the division as a first command to an Nth command (N represents an integer of 2 or more) sequentially from the beginning. The command packet generation section 235 adds electric power-resupply request information for indicating retransmission of the electric power-supply packet to the first command to the N−1th command and refers to the first command to the N−1th command added with the electric power-resupply request information as a first command packet to an N−1th command packet, and the command packet generation section 235 does not add the electric power-resupply request information to the Nth command and refers to the Nth command not added with the electric power-resupply request information as an Nth command packet. The transmission section 260 sequentially transmits the first command packet to the Nth command packet which are generated by the command packet generation section 235 to the information processing apparatus 100.

In the case where the information processing apparatus 100 includes a display section 170, the control section 130 includes a display control section 137, and in the case where the information processing apparatus 100 includes an audio output section 180, the control section 130 includes an audio output control section 139. In the case where the information processing apparatus 100 is used as a TV set, the processing execution section 136 outputs video data to the display control section 137 and also outputs audio data to the audio output control section 139. The display control section 137 causes the display section 170 to display video based on the video data, and the audio output control section 139 causes the audio output section 180 to output audio based on the audio data.

The operation terminal 200 may include a storage section 240. The storage section 240 is capable of being used for storing a program and data, for example.

[1-7. Hardware Configuration of Information Processing Apparatus]

Figure 7:
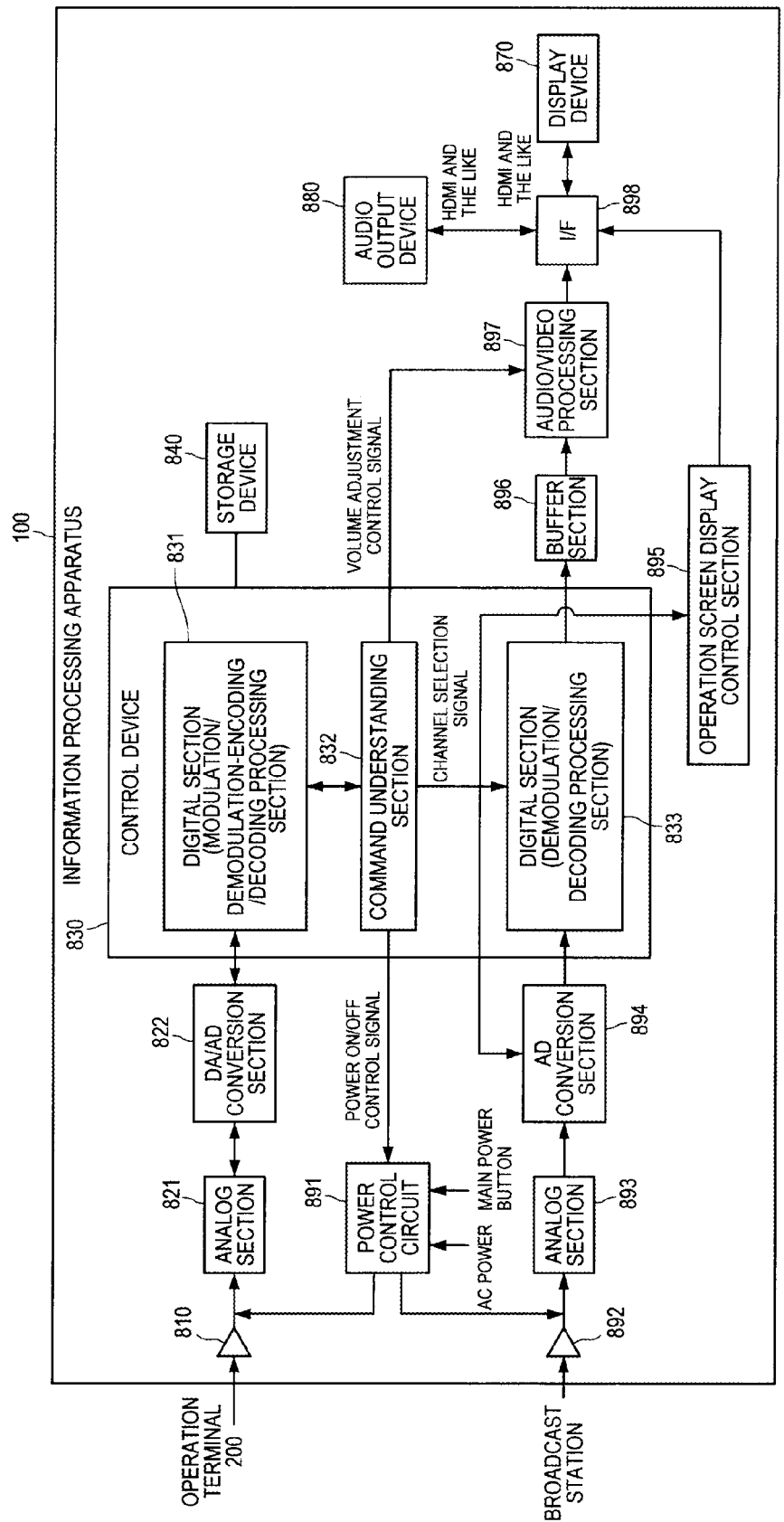
FIG. 7 is a diagram showing a hardware configuration of the information processing apparatus according to the present embodiment.

FIG. 7 is a diagram showing a hardware configuration of the information processing apparatus according to the present embodiment. With reference to FIG. 7 (refer to other figures as appropriate), the hardware configuration of the information processing apparatus according to the present embodiment will be described. Note that FIG. 7 shows a hardware configuration example in the case where the information processing apparatus 100 is applied to the TV set. Therefore, in the case where the information processing apparatus 100 is applied to a device other than the TV set, it is possible for the device to be provided with a necessary configuration which is selected appropriately from the hardware configuration shown in FIG. 7.

As shown in FIG. 7, the information processing apparatus 100 includes an antenna 810, an analog section 821, a DA/AD conversion section 822, a control device 830, a storage device 840, a power control circuit 891, an antenna 892, an analog section 893, an AD conversion section 894, a buffer section 896, an audio/video processing section 897, an I/F (Interface) 898, an audio output device 880, a display device 870, an operation screen display control section 895, and the like.

The antenna 810 functions as, for example, an example of the reception section 110, and has a function of receiving a wireless signal using a radio wave transmitted from the operation terminal 200 and outputting the wireless signal to the analog section 821. Further, the antenna 810 functions as an example of the transmission section 160, and has a function of transmitting a high-frequency signal output from the analog section 821 as a wireless signal using a radio wave.

The analog section 821 functions, for example, as an example of the first reception control section 120, and performs frequency conversion in a manner that the high-frequency signal output from the antenna 810 is converted into a baseband signal and outputs the baseband signal to the DA/AD conversion section 822. Further, the analog section 821 functions as an example of the second transmission control section 150, and performs frequency conversion in a manner that the baseband signal output from the DA/AD conversion section 822 is converted into a high-frequency signal and outputs the high-frequency signal to the antenna 810.

The DA/AD conversion section 822 functions as an example of the first reception control section 120, and converts the analog-type baseband signal output from the analog section 821 into a digital-type baseband signal and outputs the digital-type baseband signal to a digital section 831. Further, the DA/AD conversion section 822 functions as an example of the second transmission control section 150, and converts the digital-type baseband signal output from the digital section 831 into an analog-type baseband signal and outputs the analog-type baseband signal to an analog section 821.

The control device 830 functions as an example of the control section 130. The control device 830 includes, for example, a CPU (Central Processing Unit) and an RAM (Random Access Memory), and the function thereof is realized by reading a program stored in the storage device 840, developing the program in the RAM, and executing the program developed in the RAM. Further, the control device 830 may include a dedicated circuit. The control device 830 includes a digital section (modulation/demodulation-encoding/decoding processing section) 831, a command understanding section 832, and a digital section (demodulation/decoding processing section) 833.

The digital section 831 functions, for example, as an example of the second reception control section 131. The digital section 831 performs demodulation processing, decoding processing, and the like with respect to the digital-type baseband signal output from the DA/AD conversion section 822, and outputs the processed digital-type baseband signal to the command understanding section 832. Further, the digital section 831 functions as an example of the first transmission control section 138. The digital section 831 performs modulation processing, encoding processing, and the like with respect to the digital-type baseband signal output from the command understanding section 832, and outputs the processed digital-type baseband signal to the DA/AD conversion section 822.

The storage device 840 functions as an example of the storage section 140, and includes, for example, a non-volatile memory such as an HDD (Hard Disk Drive). In the case where the control section 130 includes a CPU, an RAM, and the like, the storage device 840 has a function of storing a program to be executed by the control section 130 and various kinds of data used when the control section 130 executes the program.

The command understanding section 832 functions as an example of the packet acquisition section 132. The command understanding section 832 extracts a command from the signal output from the digital section 831, understands the extracted command, and outputs a signal to each block based on the understood command. For example, when the understood command indicates switching the power between ON and OFF, the command understanding section 832 outputs a power ON/OFF control signal to the power control circuit 891. Further, for example, when the understood command indicates channel selection, the command understanding section 832 outputs a channel selection signal to the AD conversion section 894, the digital section 833, the operation screen display control section 895, and the like. Still further, for example, when the understood command indicates volume adjustment, the command understanding section 832 outputs a volume adjustment control signal to the audio/video processing section 897.

Further, in the case where the understood commands are the selection signal, the rotation direction of the spherical object 430, and the rotation amount of the spherical object 430, the command understanding section 832 outputs a command determined by the selection signal, the rotation direction of the spherical object 430, and the rotation amount of the spherical object 430 to each block via a signal. For example, the command understanding section 832 specifies a position on the screen based on the rotation direction and rotation amount of the spherical object 430, and in the case where it is determined that the specified position exists within a region for command selection on the screen at the time when the selection signal is input, the command understanding section 832 outputs the command to each block via a signal.

The power control circuit 891 includes a main power button, and when the main power button is held down by the user U and the like, the power control circuit 891 acquires electric power from AC (Alternating Current) power source, and supplies the acquired electric power to the antenna 810, the antenna 892, and the like.

The antenna 892 receives a program data signal as an example of the data processed in the information processing apparatus 100 from a broadcast station and the like, and outputs the program data signal to the analog section 893.

The analog section 893 performs frequency conversion in a manner that the high-frequency signal output from the antenna 892 is converted into a baseband signal and outputs the baseband signal to the AD conversion section 894.

The AD conversion section 894 extracts, based on the channel selection signal output from the command understanding section 832, a signal having a frequency designated by the channel which is indicated by the channel selection signal, from the analog-type baseband signal output from the analog section 893, and then converts the extracted signal into a digital-type baseband signal and outputs the digital-type baseband signal to the digital section 833.

The digital section 833 performs, based on the channel selection signal output from the command understanding section 832, demodulation processing, decoding processing, and the like with respect to the digital-type baseband signal output from the AD conversion section 894, and outputs the processed digital-type baseband signal to the buffer section 896 as an audio/video signal.

The buffer section 896 has a function of temporality accumulating the audio/video signal output from the digital section 833. The audio/video signal temporarily accumulated in the buffer section 896 is appropriately extracted by the audio/video processing section 897.

The audio/video processing section 897 extracts the audio/video signal from the buffer section 896, and separates an audio signal and a video signal from the extracted audio/video signal. The audio/video processing section 897 performs, with respect to the audio signal obtained by the separation, processing to adjust the volume based on the volume adjustment control signal output from the command understanding section 832, and outputs the video signal and the audio signal in which the volume has been adjusted to the I/F 898.

The operation screen display control section 895 specifies, based on the channel selection signal output from the command understanding section 832, information such as a channel number to be displayed and a display position of the channel number, and outputs the information such as the specified channel number and display position of the channel number to the I/F 898.

The I/F 898 outputs the audio signal output from the audio/video processing section 897 to the audio output device 880 through an HDMI (High Definition Multimedia Interface) and the like. Further, the I/F 898 outputs the video signal output from the audio/video processing section 897 to the display device 870 through the HDMI and the like. The I/F 898 superimposes, on the video signal, the channel number or the like created from the operation screen display control section 895 based on the information such as the channel number and the display position of the channel number.

The display device 870 functions as an example of the display section 170, and has a function of outputting video based on the video signal output from the I/F 898.

The audio output device 880 functions as an example of the audio output section 180, and has a function of outputting audio based on the audio signal output from the I/F 898.

[1-8. Hardware Configuration of Operation Terminal]

Figure 8:
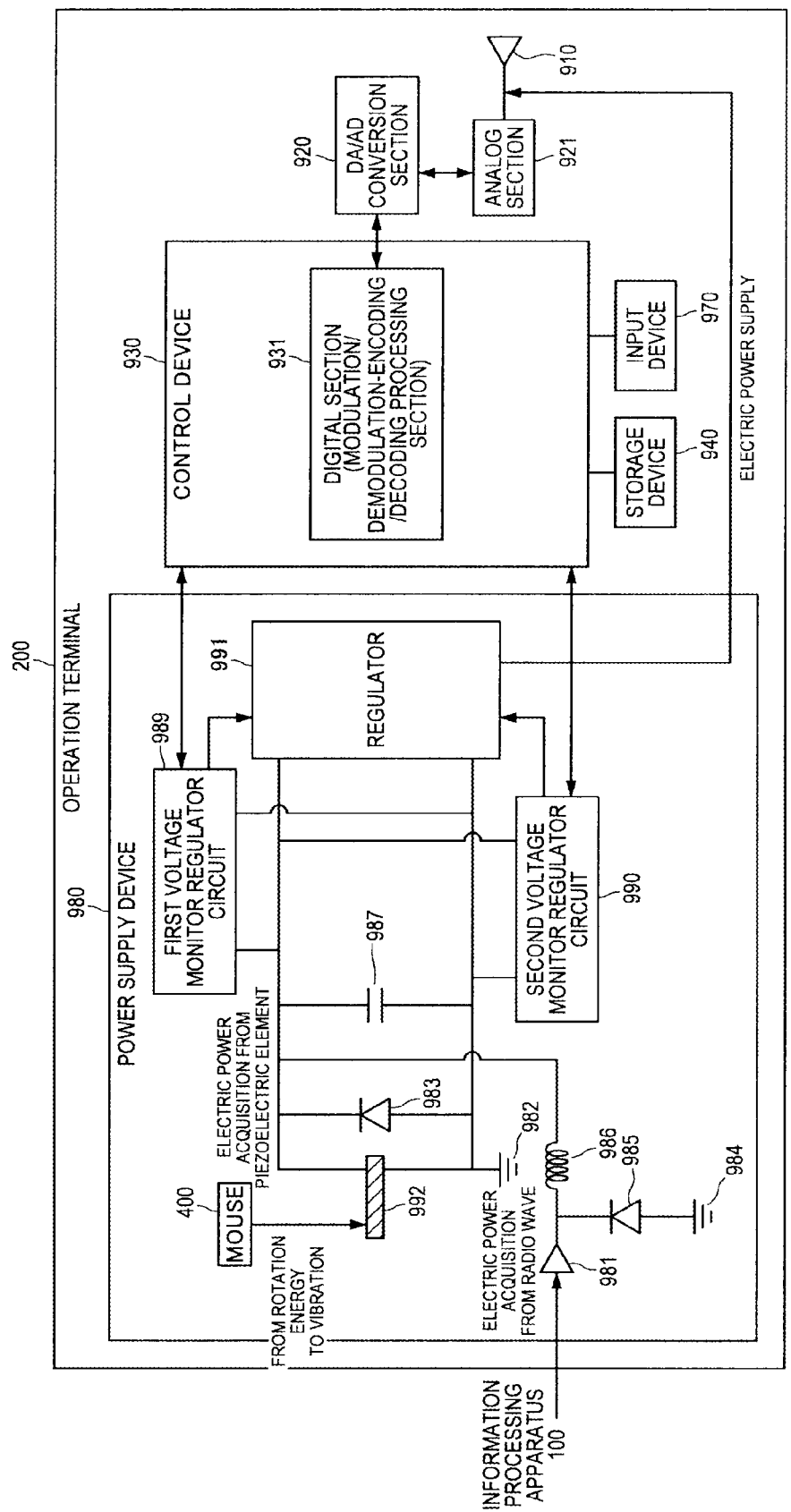
FIG. 8 is a diagram showing a hardware configuration of the operation terminal according to the present embodiment.

FIG. 8 is a diagram showing a hardware configuration of the operation terminal according to the present embodiment. With reference to FIG. 8 (refer to other figures as appropriate), the hardware configuration of the operation terminal according to the present embodiment will be described. Note that FIG. 8 shows an example of the hardware configuration of the operation terminal 200. Therefore, it is possible for the operation terminal to be provided with a necessary configuration which is selected appropriately from the hardware configuration shown in FIG. 8.

As shown in FIG. 8, the operation terminal 200 includes a power supply device 980, a control device 930, a storage device 940, an input device 970, a DA/AD conversion section 920, an analog section 921, an antenna 910, and the like. The power supply device 980 includes an antenna 981, a ground point 982, a commutator 983, a ground point 984, a commutator 985, a coil 986, a capacitor 987, a first voltage monitor regulator circuit 989, a second voltage monitor regulator circuit 990, a regulator 991, and the like. In addition thereto, the power supply device 980 includes a piezoelectric element 992 and also includes the mouse 400 which has the spherical object 430.

The antenna 981 functions as an example of the electric power-supply packet acquisition section 281, and receives a wireless signal using a radio wave transmitted from the information processing apparatus 100. The wireless signal using a radio wave received by the antenna 981 is converted into a half-wave rectified wave by the commutator 983 and the converted half-wave rectified wave flows into the capacitor 987, and hence, electric power is accumulated in the capacitor 987. The volume of the capacitor 987 may be any as long as it is large enough for accumulating the electric power for transmitting a packet. As the capacitor 987, there can be used a chip capacitor or the like.

The electric power accumulated in the capacitor 987 is monitored by the voltage monitor performed by the first voltage monitor regulator circuit 989 and the second voltage monitor regulator circuit 990. The first voltage monitor regulator circuit 989 functions as an example of the first monitor section 284, and the second voltage monitor regulator circuit 990 functions as an example of the second monitor section 285. In the case where it is determined by the first voltage monitor regulator circuit 989 that the electric power accumulated in the capacitor 987 exceeds a predetermined value, the regulator 991 supplies the electric power to the antenna 910. Further, in the case where it is determined by the second voltage monitor regulator circuit 990 that the electric power accumulated in the capacitor 987 exceeds the predetermined value, the regulator 991 supplies the electric power to the antenna 910.

The control device 930 functions as an example of the control section 230. The control device 930 includes, for example, a CPU and an RAM, and the function thereof is realized by reading a program stored in the storage device 940, developing the program in the RAM, and executing the program developed in the RAM. Further, the control device 930 may include a dedicated circuit. The control device 930 includes a digital section (modulation/demodulation-encoding/decoding processing section) 931.

The digital section 931 functions, for example, as an example of the first transmission control section 236. The digital section 931 performs demodulation processing, decoding processing, and the like with respect to a digital-type baseband signal such as various kinds of packet generated in the control device 930, and outputs the processed digital-type baseband signal to the DA/AD conversion section 920.

The DA/AD conversion section 920 functions as an example of the second transmission control section 250. The DA/AD conversion section 920 converts the digital-type baseband signal output from the digital section 831 into an analog-type baseband signal and outputs the analog-type baseband signal to the analog section 921.

The analog section 921 functions, for example, as an example of the second transmission control section 250. The analog section 921 converts the baseband signal output from the DA/AD conversion section 920 into a high-frequency signal and output the high-frequency signal to the antenna 910.

The antenna 910 functions, for example, as an example of the transmission section 260, and has a function of transmitting the high-frequency signal output from the analog section 921 as a wireless signal using a radio wave.

The storage device 940 functions as an example of the storage section 240, and includes, for example, a non-volatile memory. In the case where the control section 230 includes a CPU, an RAM, and the like, the storage device 940 has a function of storing a program to be executed by the control section 230 and various kinds of data used when the control section 230 executes the program.

The input device 970 functions as an example of the input section 270, and is, for example, capable of accepting input of information from a user U through a button operation.

[1-9. Example of Screen Displayed on Display Section of Information Processing Apparatus]

Figure 9:
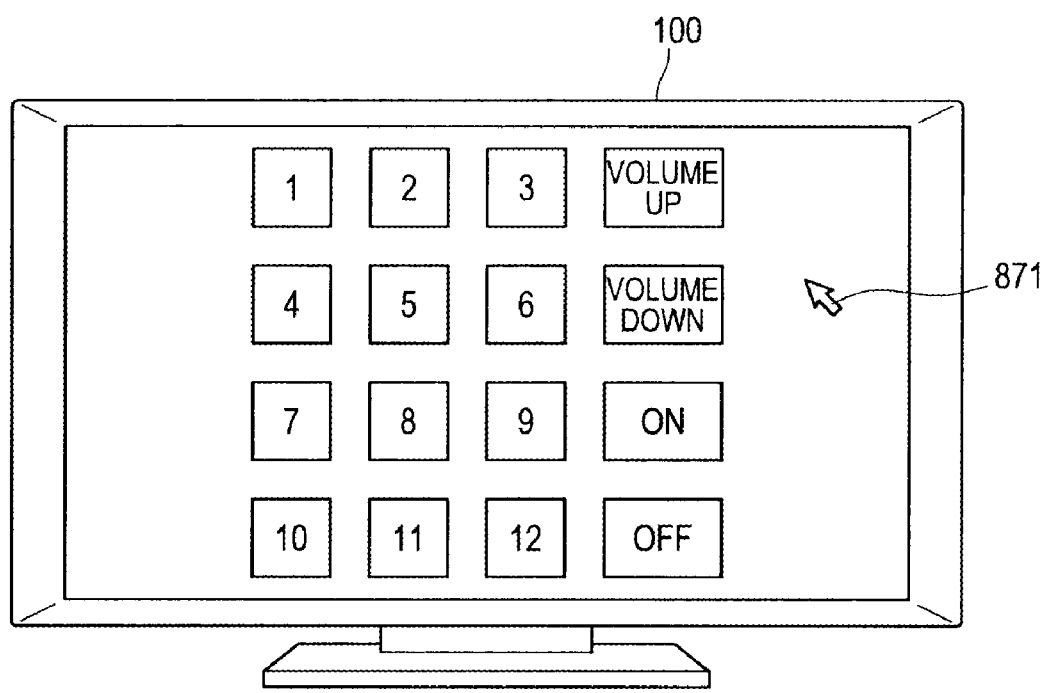
FIG. 9 is a diagram showing an example of a screen displayed on a display section of the information processing apparatus according to the present embodiment.

FIG. 9 is a diagram showing an example of a screen displayed on a display section of the information processing apparatus. With reference to FIG. 9 (refer to other figures as appropriate), the example of the screen displayed on the display section of the information processing apparatus will be described.

By the user U moving the operation terminal 200 and clicking the selection signal accepting section 460 at a predetermined part, it becomes possible to select a channel, to adjust a volume level, and to perform operation of turning power of the information processing apparatus 100 ON/OFF, on the screen shown in FIG. 9. There are displayed within the screen, as a region corresponding to a command, channels 1 to 12, volume up, volume down, power ON, power OFF, and the like.

[1-10. Flow of Processing Executed by Information Processing System]

FIG. 10 is a sequence diagram showing a flow of processing executed by the information processing system. With reference to FIG. 10 (refer to other figures as appropriate), the flow of processing executed by the information processing system will be described.

As shown in FIG. 10, the operation terminal 200 determines whether the electric power stored in the capacitor section 282 is equal to or more than a predetermined amount (step S101). In the case where the operation terminal 200 determines that the electric power stored in the capacitor section 282 is not equal to or more than the predetermined amount ("No" in step S101), the operation terminal 200 acquires electric power from the movement operation of the mouse 400 performed by the user U (step S102) and proceeds to step S103. In the case where the operation terminal 200 determines that the electric power stored in the capacitor section 282 is equal to or more than the predetermined amount ("Yes" in step S101), the operation terminal 200 transmits a trigger packet to the information processing apparatus 100 (step S103).

The information processing apparatus 100 receives the trigger packet from the operation terminal 200 (step S104), and causes the display section 170 to display an operation screen (step S105). Subsequently, the information processing apparatus 100 intermittently transmits an electric power-supply packet to the operation terminal 200 (step S106).

The operation terminal 200 intermittently receives the electric power-supply packet transmitted from the information processing apparatus 100 (step S107), and acquires electric power from the received electric power-supply packet (step S108). The operation terminal 200 acquires electric power from movement operation of the mouse 400 performed by the user U (step S109). The operation terminal 200 transmits a command packet to the information processing apparatus 100 by using the electric power acquired in step S108 or step S109 (step S110).

When the information processing apparatus 100 receives the command packet from the operation terminal 200 (step S111), the information processing apparatus 100 executes processing designated by a command included in the received command packet (step S112).

2. Modified Example

It should be understood by those skilled in the art that various modifications, combinations, sub-combinations and alterations may occur depending on design requirements and other factors insofar as they are within the scope of the appended claims or the equivalents thereof.

For example, in the present embodiment, the user U moves the operation terminal 200 to thereby rotate the spherical object 430, and hence, the electric power is generated by using the energy generated from the rotation, but the electric power may also be generated by using a motor or the like.

Further, in the present embodiment, the operation terminal 200 has, like a usual mouse, the selection signal accepting section 460, and by the user U clicking the selection signal accepting section 460, a corresponding part on the screen can be selected, but the operation terminal 200 itself may have an equivalent number of buttons to the number of buttons provided to a usual remote control.

3. Summary

According to the first embodiment, it becomes possible to supply electric power to be used by an operation terminal which does not have a battery without providing an unnatural feeling to a user. The electric power is supplied to the operation terminal without power source by natural operation, and hence, it becomes possible to operate an information processing apparatus such as a TV set or a personal computer by using the operation terminal supplied with the electric power.

Further, even in the case where the electric power of the operation terminal runs down completely, it is possible to resupply electric power by a natural motion. By displaying a region (remote control button or the like) for designating a command on the display section of the information processing apparatus, it becomes possible to provide a natural user interface.

The present application contains subject matter related to that disclosed in Japanese Priority Patent Application JP 2009-180995 filed in the Japan Patent Office on Aug. 3, 2009, the entire content of which is hereby incorporated by reference.

What is claimed is:

1. An operation terminal comprising:
   a spherical object;
   an electric power acquisition section, comprising a piezoelectric element, to convert energy generated by rotation of the spherical object by a force applied by a user into energy for striking the piezoelectric element;
   a capacitor section to acquire and accumulate electric power generated by striking the piezoelectric element;
   an input section to accept input of operation information including a command for designating processing that an information processing apparatus is caused to execute;
   a command acquisition section to acquire the command from the operation information, wherein the input of the operation information is accepted by the input section;
   a trigger packet generation section to generate, when the command is acquired by the command acquisition section, a trigger packet which is smaller than a command packet including the command;
   an electric power-supply control section to supply the electric power accumulated in the capacitor section; and
   a transmission section to transmit the trigger packet generated by the trigger packet generation section to the information processing apparatus via a wireless signal by using the electric power supplied from the electric power-supply control section.

2. The operation terminal according to claim 1, further comprising:
   an electric power-supply packet acquisition section to acquire an electric power-supply packet for supplying electric power from the information processing apparatus which received the trigger packet via a wireless signal; and
   a command packet generation section which generates the command packet, wherein:
   the capacitor section acquires and accumulates electric power from the electric power-supply packet acquired by the electric power-supply packet acquisition section, and
   the transmission section further transmits the command packet generated by the command packet generation section to the information processing apparatus by using the electric power supplied from the electric power-supply control section.

3. The operation terminal according to claim 1, further comprising;
   an electric power-supply packet acquisition section to acquire an electric power-supply packet for supplying electric power from the information processing apparatus which received the trigger packet via a wireless signal, wherein:
   the capacitor section acquires and accumulates electric power from the electric power-supply packet acquired by the electric power-supply packet acquisition section,
   the input section includes the spherical object, a selection signal accepting section to accept a selection signal from the user, and a detection section to detect a rotation direction and a rotation amount of the spherical object, and
   the transmission section further transmits the rotation direction and the rotation amount of the spherical object detected by the detection section to the information processing apparatus and further transmits the selection signal accepted by the selection signal accepting section to the information processing apparatus, by using the electric power supplied from the electric power-supply control section.

4. An operation terminal comprising:
   an electric power acquisition section comprising a piezoelectric element, wherein the electric power acquisition section is operable to convert energy generated by rotation of a spherical object into energy for striking the piezoelectric element;
   a capacitor section operable to acquire and accumulate electric power generated by striking the piezoelectric element; and
   a transmission section operable to transmit a trigger packet to an information processing apparatus via a wireless signal by using the electric power accumulated in the capacitor section, wherein the trigger packet is generated when input of operation information is accepted.

5. The operation terminal according to claim 4, further comprising an electric power-supply packet acquisition section operable to acquire an electric power-supply packet for supplying electric power from the information processing apparatus, wherein the electric power of the electric power-supply packet is accumulated in the capacitor section.

6. The operation terminal according to claim 5, further comprising an input section operable to accept the input of operation information.

7. The operation terminal according to claim 6, wherein the input section comprises:
- a selection signal accepting section operable to accept a selection signal from a user; and
- a detection section operable to detect a rotation direction and a rotation amount of the spherical object.

8. The operation terminal according to claim 7, wherein the transmission section is operable to transmit the selection signal, the rotation direction, and the rotation amount to the information processing apparatus by using the electric power of the electric power-supply packet accumulated in the capacitor section.

9. The operation terminal according to claim 8, further comprising a command packet generation section operable to generate a command packet including a command, wherein the transmission section transmits the command packet to the information processing apparatus by using the electric power of the electric power-supply packet accumulated in the capacitor section.

* * * * *